United States Patent [19]

Klüting

[11] Patent Number: 5,501,421
[45] Date of Patent: Mar. 26, 1996

[54] STAY BAR SUPPORT FOR VEHICLE DOOR STOP

[75] Inventor: Bernd-Alfred Klüting, Radevormwald, Germany

[73] Assignee: ED. Scharwächter GmbH & Co., KG, Remscheid, Germany

[21] Appl. No.: 403,114

[22] Filed: Mar. 13, 1995

Related U.S. Application Data

[63] Continuation of Ser. No. 53,023, Apr. 23, 1993, abandoned.

[30] Foreign Application Priority Data

Apr. 23, 1992 [DE] Germany .......................... 42 13 298.3

[51] Int. Cl.⁶ ...................................................... A47F 5/00
[52] U.S. Cl. ........................ 248/288.3; 403/131; 403/162
[58] Field of Search .............................. 248/288.3, 288.1, 248/295.1, 298; 403/131, 162, 151, 154, 161

[56] References Cited

U.S. PATENT DOCUMENTS

| | | | |
|---|---|---|---|
| 2,046,568 | 7/1936 | Lundy | 403/131 X |
| 2,365,552 | 12/1944 | Hill | 403/131 X |
| 2,382,773 | 8/1945 | Chambers et al. | 403/131 X |
| 2,766,079 | 10/1956 | Browne | 403/131 X |
| 3,250,556 | 5/1966 | Couch et al. | 403/131 |
| 3,913,958 | 10/1975 | Larime | 403/131 X |
| 4,858,962 | 8/1989 | Bolling et al. | 403/131 X |
| 4,909,654 | 3/1990 | Tysver | 403/131 X |
| 5,056,951 | 10/1991 | Mariani | 403/131 X |
| 5,172,819 | 12/1992 | Daugherety, Jr. et al. | 403/131 X |

*Primary Examiner*—Blair M. Johnson
*Attorney, Agent, or Firm*—Anderson Kill Olick & Oshinsky

[57] ABSTRACT

A stay bar support for a door stop of a vehicle door assembly including a stay bar, which is connectable to the door or the door post, a support bracket connectable to the other of the door and the door post, and a spherical bearing which pivotally supports the stay bar on a gudgeon secured in the support bracket.

14 Claims, 3 Drawing Sheets

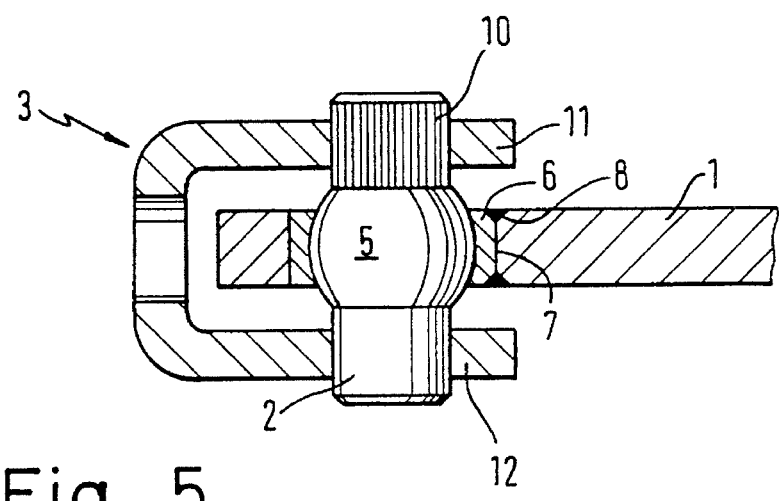
Fig. 5
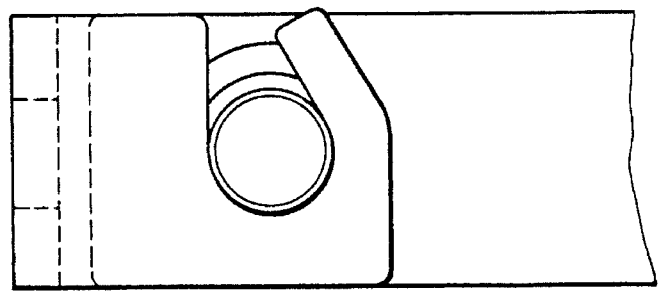
Fig. 6
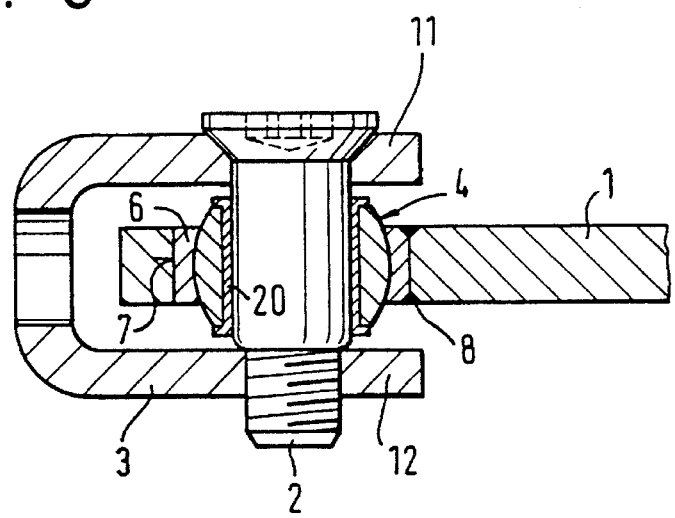

STAY BAR SUPPORT FOR VEHICLE DOOR STOP

This is a continuation of application Ser. No. 08/053,023, abandoned, filed Apr. 23, 1993.

The invention relates to a stay bar support for a door stop of a vehicle door assembly and which includes a stay bar connectable to one of the door and door post and pivotally supported on a gudgeon, which is connected with the other of the door and door post by means of a support bracket.

With such stay bar supports for vehicle door stops, usually an asymmetrical cooperation between the door stay bar and the support takes place because of an angular positioning of the stay bar or because of at least partial braking or locking of the stay bar with respect to the support or its elements. As a result, along with a substantial premature wear, also noise is generated when the door stay bar passes through the support housing. Because the adjacent vehicle body parts, the door and the door post, are hollow bodies which act as resonance bodies, the smallest noise, which is generated in the door stop, is increased many times over, as when a vehicle door opens so when the door closes, and becomes totally disagreeable.

Accordingly, one object of the invention is a door stay bar support which, on one hand, can be manufactured and installed with minimum costs and, on the other hand, insures a lasting and smooth operation, without reduction of the support rigidity.

Another object of the invention is a door stay bar support which insures that the door stay bar retains a substantially aligned position with respect to the opening of the support housing and parallel to the brake and support elements, independent of an eventual positional displacement of the pivotal support.

SUMMARY OF THE INVENTION

These and other objects of the invention, which will become apparent hereinafter, are achieved by providing a stay bar support for a vehicle door stop of the above-mentioned type in which, according to the invention, the stay bar is pivotally supported on the gudgeon by means of a spherical bearing, which has a bearing body formed as spherical segment member supported on the gudgeon. Such execution of a pivot support for a stay bar provides, on one hand, for a satisfactory rigid configuration of the support and, on the other hand, for an automatic precise self-alignment of the stay bar with respect to the support housing opening or to brake and/or support elements, which are arranged in the housing, without impairing the absence of play in the bearing. Thus, misalignment of a stay bar, formed in particular from a flat material, with respect to the housing opening is avoided, in particular when the support bracket and the support housing are mounted on respective elements of the door assembly, the door and the door post, with substantial tolerances.

It is especially advantageous that the spherical bulging of the bearing increases the support surface and thereby automatically insures a more reliable support, even when larger peak forces are acting thereon.

Generally, the spherical segment member, which forms the bearing body, can be formed by corresponding deformation of the free end of the gudgeon, which is supported in the support bracket in a cantilever fashion, or by bulging out the middle portion of the gudgeon, which is supported in a two-arm support bracket. However, in many cases, the spherical segment member, which forms the bearing body of the spherical bearing, can be formed as a prefabricated part and then placed onto the gudgeon in a desired location with an interference fit.

In order to be able to compensate not only misalignment, in the pivot support, of the door stay bar relative to the support housing opening but, additionally, to be able to compensate also a large difference in the positions of the support bracket, on one side, and the support housing, on the other side, within a wide range, it is envisaged, according to the first embodiment of the invention, that the bearing journal of the gudgeon, when the spherical segment member forming the bearing body is formed as one-piece with the gudgeon or is fixedly connected therewith, is advantageously supported in the support bracket without a possibility of rotation but with a possibility of axial displacement.

In order to be able to compensate not only misalignment, in the pivot support, of the door stay bar relative to the support housing opening but, additionally to be able to compensate also a large difference in the positions of the support bracket, on one side, and the support housing, on the other side, within a wide range, it is envisaged, according to a further embodiment of the invention, that the bearing body of the spherical bearing is axially displaceable on the gudgeon. In order to facilitate the relocatability of the spherical segment member, which forms the bearing body, the spherical segment member is supported on the gudgeon, which is generally formed cylindrical, by means of a support sleeve made of maintenance-free material. In order to be able to use door stay bars, which are formed as one-piece part or a part consisting of several pieces of a flat material, it is further envisaged, according to the invention, that the height of the spherical bearing raceway is at least substantially equal to the thickness of the stay bar, and the bearing raceway of the spherical bearing is secured in a bore, which may be uncircular, if needed, with an interference fit.

For fixed positioning of the bearing raceway in the bore of the door stay bar, it can additionally be contemplated to provide separate local deformations in the door stay bar opening around the outer circumference of the raceway, which deformations formlockingly engage the outer circumference of the raceway. Further, independent from the configuration and the arrangement of the spherical bearing, it can be envisaged, according to a further development of the invention, that the bearing body of the spherical bearing has a greater axial height than the bearing raceway or the thickness of the stay bar. This insures a free floating self-alignment of the door stay bar, independent of the configuration of the arms of the support bracket.

In a first practical embodiment of the invention, a two-arm support bracket has been used whose both arms encompass the end of the door stay bar in a fork-like manner, with the gudgeon being secured against rotation in the support bracket arms. This provides for a natural limitation of the axial displacement of the bearing body on the gudgeon.

In a second practical embodiment of the invention, it can be envisaged to mount the gudgeon on a one-arm support bracket in a cantilever fashion, also with securing the gudgeon against rotation. This gudgeon may be provided at its free end with appropriately deformed or placed head part. At that, the axial displacement of the bearing body on the head part can be limited by a nut screwed on the free end or by additional deformation of the free end.

Both parts of the spherical bearing are formed of a maintenance-free cooperating combination of appropriate materials, and can be formed of a suitable plastic material or at least the parts may be provided with a coating of a maintenance-free bearing material.

BRIEF DESCRIPTION OF THE DRAWINGS

The features and objects of the present invention will become more apparent and the invention itself will be best understood from the following detailed description of the preferred embodiment when read with reference to the accompanying drawings, wherein:

FIG. 5 is a cross-sectional view of a fourth embodiment of a stay bar support for a vehicle door stop according to the present invention; and FIG. 6 is a cross-sectional view of a fifth embodiment of a stay bar support for a vehicle door stop according to the present invention.

DETAILED DESCRIPTION OF THE PREFERRED EMBODIMENTS

A stay bar 1 of a door stop (not shown) for a vehicle door is pivotally supported at its free end by means of a gudgeon 2 in a support bracket 3, which is attached to a door assembly (likewise not shown).

Figure 1:
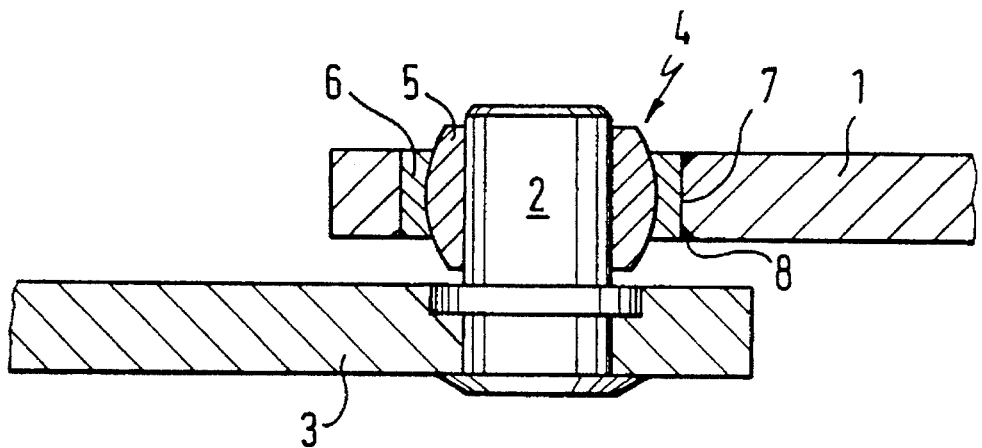
FIG. 1 is a cross-sectional view of a first embodiment of a stay bar support for a vehicle door stop according to the present invention.
Figure 2:
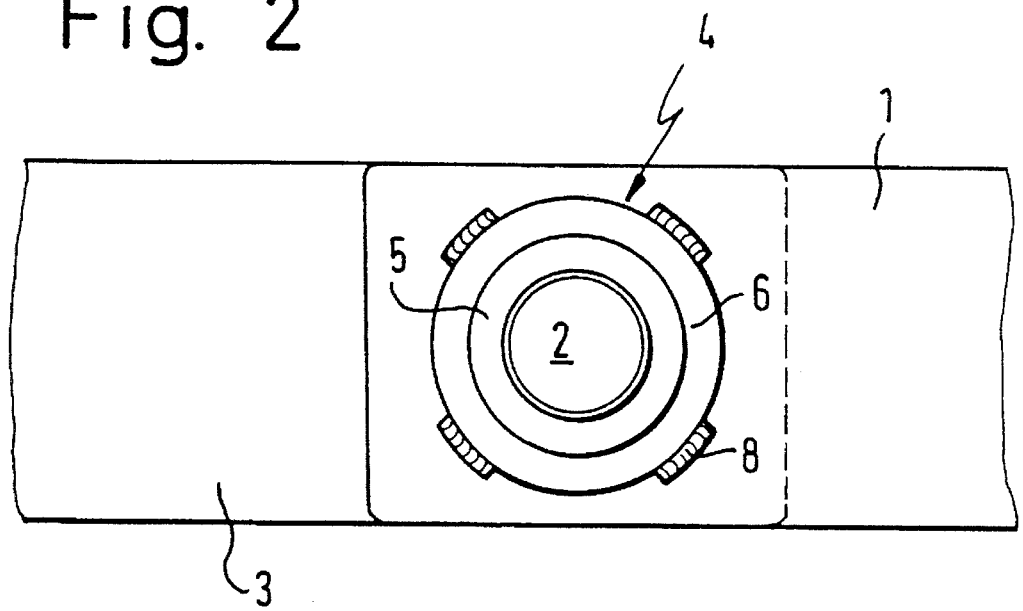
FIG. 2 is a plan view of the stay bar support shown in FIG. 1.

In the embodiment shown in FIG. 1, the gudgeon 2 has a cylindrical shape and is attached, in a cantilever fashion, to a one-arm bracket 3 by being riveted thereto. A spherical segment member 5, which forms a body of a spherical bearing 4, is supported on the gudgeon 2 with a possibility of axial displacement. A bearing raceway 6, which has a radius corresponding to the inner circumference of the bearing body formed by the spherical segment body 5, is associated therewith. The bearing raceway 6 is located, with an interference fit, in a bore 7 of the stay bar 1, without a possibility of rotation and axial displacement. In the embodiment shown in FIG. 1, the bearing raceway 6 is additionally secured in the bore 7 of the stay bar 1 with radially extending deformations of the bore rim.

Figure 3:
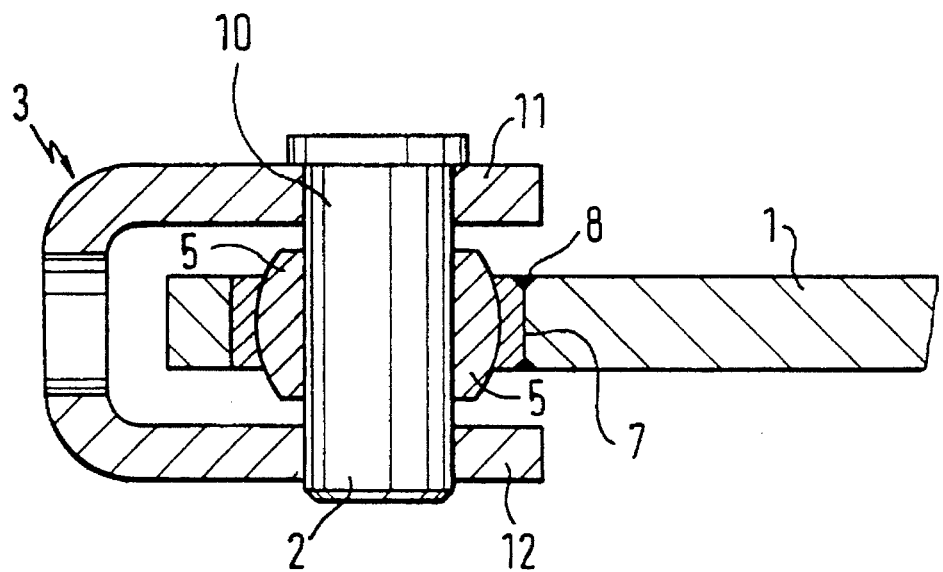
FIG. 3 is a cross-sectional view of a second embodiment of a stay bar support for a vehicle door stop according to the present invention.

In the embodiment of a door stay bar support shown in FIG. 3, the bearing body, which is formed by the spherical segment member 5, is also supported on the gudgeon 2 with a possibility of axial displacement. The gudgeon 2 is located in a two-arm support bracket 3 and is secured against rotation in a knurled opening 10 in the arm 11 of the support bracket 3. The two arms 11 and 12 of the support bracket 3 simultaneously serve as limiting stops during axial displacement of the spherical segment body 5.

Figure 4:
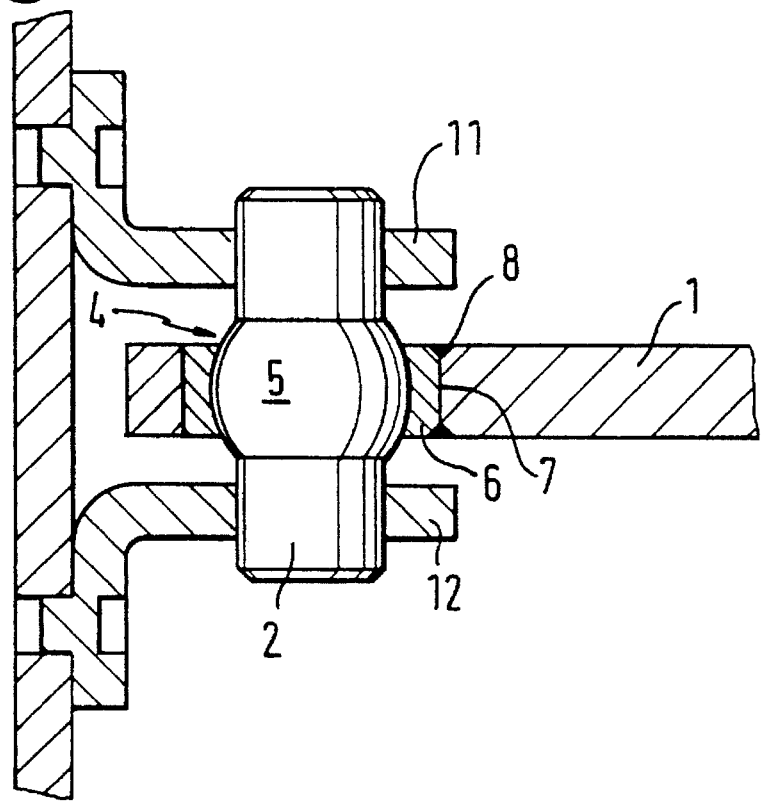
FIG. 4 is a cross-sectional view of a third embodiment of a stay bar support for a vehicle door stop according to the present invention.

In the embodiments shown in FIGS. 4 and 5, the spherical segment member 5, which forms the bearing body of the spherical bearing 4 is formed as one-piece with the gudgeon 2. The gudgeon 2 is supported in the arms 11 and 12 of the two-arm support bracket 3 with a possibility of axial displacement, in order to insure axial adjustment of the spherical bearing 4. However, in the embodiment of FIG. 5, it is additionally envisaged that the gudgeon 2 is supported against rotation in the arm 11 of the support bracket 3 of axially projecting knurls of the opening 10.

In the embodiment of a stay bar support shown in FIG. 6, the gudgeon 2, which is located in the two-arm bearing bracket 3, is formed as a stepped offset screw bolt. The separate segment member 5, which forms the bearing body of the spherical bearing 4, is axially displaceably supported on the gudgeon 2 by means of a support sleeve 20 made of a maintenance-free bearing material.

In the embodiments of a door stay bar support shown in FIGS. 3–6, the spherical segment member 5, which forms the bearing body, has an axial height, which is about two times greater than the thickness of the stay bar 1. This insures a more reliable positioning when a two-arm bearing bracket is used, so that the door stay bar 1 does not contact the arm 11 or 12 of the bearing bracket 5 during movement of the door stop to its utmost upper or lower displacement positions.

While particular embodiments of the present invention have been shown and described, various modification thereof will be apparent to those skilled in the art and, therefore, it is not intended that the invention be limited to the shown embodiments or details thereof, and departures may be made therefrom within the spirit and scope of the present invention as defined in the appended claims.

What is claimed is:

1. A stay bar support for a door stop of a vehicle door assembly including a door and a door post, said stay bar support comprising:

a plate-like stay bar for connection to one of the door and the door post and having a bore;

a support bracket for connection to another one of the door and the door post;

a gudgeon supported in said support bracket and extending into said bore of said stay bar for pivotally supporting said stay bar; and spherical bearing means for pivotally supporting said stay bar on said gudgeon, said bearing means including a raceway formed as a washer and fixedly secured in said bore of said stay bar with an interference fit, said raceway having a height which is substantially equal to a thickness of said stay bar.

2. A stay bar support as set forth in claim 1, wherein said spherical bearing means comprises a bearing body formed as a spherical segment member, which is fixedly connected with said gudgeon.

3. A stay bar support as set forth in claim 2, wherein said spherical segment member is formed as one-piece with said gudgeon.

4. A stay bar support as set forth in claim 2, wherein said gudgeon is supported in said support bracket in a cantilever fashion, said spherical segment member being formed as one-piece with said gudgeon at a free end thereof.

5. A stay bar support as set forth in claim 2, wherein said support bracket is formed as a two-arm bracket, said gudgeon is supported in said two arms, and said spherical segment member is formed as one-piece with said gudgeon in a middle portion thereof symmetrically relative to opposite ends of said gudgeon.

6. A stay bar support as set forth in claim 2, wherein said gudgeon is axially displaceable in said support bracket.

7. A stay bar support as set forth in claim 2, further comprising a bearing sleeve made of a maintenance-free material for displaceably supporting said bearing body on said gudgeon.

8. A stay bar support as set forth in claim 7, wherein said bearing body is formed as a discoid part.

9. A stay bar support as set forth in claim 1, wherein said raceway, in addition to the interference fit, is retained in said bore of said stay bar with radially extending local edge deformations of the surface defining said bore.

10. A stay bar support as set forth in claim 1, wherein said stay bar is formed of at least one flat material blank, and said spherical bearing means has a height approximately equal to the thickness of said stay bar.

11. A stay bar support as set forth in claim 1, wherein said support bracket is formed as a two-arm bracket with two arms thereof encompassing a free end of said stay bar in a fork-like manner, with said gudgeon being secured against rotation at least in one arm.

12. A stay bar support as set forth in claim 1, wherein said support bracket is formed as a one-arm bracket, and said gudgeon is supported in said one-arm bracket in a cantilever fashion and has a head part formed or placed on a free end thereof.

13. A stay bar support as set forth in claim 1, wherein said spherical bearing means comprises a bearing body supported on said gudgeon, said bearing body and said raceway being made of a maintenance-free material.

14. A stay bar as set forth in claim 13, wherein said bearing body has a height greater than the height of said raceway and the thickness of said stay bar.

* * * * *